United States Patent [19]
Tsuchiya

[11] Patent Number: 5,239,665
[45] Date of Patent: Aug. 24, 1993

[54] ELECTRONIC BOOK HAVING SEVERAL KEYS FOR CHANGING PAGES AND UNDERLINING CERTAIN PORTIONS OF TEXT

[75] Inventor: Haruki Tsuchiya, Chiba, Japan

[73] Assignees: Hiuka Sangyo Kabushiki Kaisha; Kabushiki Kaisha System Gijyutsu Kenkyuusho, both of Japan

[21] Appl. No.: 980,091

[22] Filed: Nov. 23, 1992

Related U.S. Application Data

[63] Continuation of Ser. No. 498,403, Mar. 26, 1990, abandoned.

[30] Foreign Application Priority Data

Mar. 30, 1989 [JP] Japan .................... 1-79511

[51] Int. Cl.⁵ ............................................ G06F 13/00
[52] U.S. Cl. ........................ 395/800; 364/DIG. 1; 364/222.2; 364/222.3; 364/237.2
[58] Field of Search .............. 364/DIG. 1 MS File, 364/ DIG. 2 MS File; 395/200, 100, 118, 144, 145, 146, 150, 155, 600, 800, 500

[56] References Cited

U.S. PATENT DOCUMENTS

4,985,697  1/1991  Boulton ........................ 340/750

OTHER PUBLICATIONS

Paint Show ™ Plus User's Manual by Logitech (Jul. 1988), pp. ii, 19, 59, and 64.

Primary Examiner—Robert S. Harrell
Attorney, Agent, or Firm—Jones, Tullar & Cooper

[57] ABSTRACT

An electronic book which permits retrieval and visual presentation of information from memory such as floppy disks or laser cards in the same fashion as books, magazines or newspapers. Renewal of information in the paperless book may be effected by changing, for instance floppy disks or by receiving information on the air or over the telephone and putting the so-received information in the inner memory of the paperless book. The paperless book permits an individual reader to read sequential visual presentations of information at a speed at which he can read books, magazines or newspapers.

3 Claims, 5 Drawing Sheets

ELECTRONIC BOOK HAVING SEVERAL KEYS FOR CHANGING PAGES AND UNDERLINING CERTAIN PORTIONS OF TEXT

This is a continuation of co-pending application Ser. No. 07/498,403 filed on Mar. 26, 1990, now abandoned.

BACKGROUND OF THE INVENTION

1. Field of the Invention

The present invention relates to a apparatus for retrieving and displaying the contents of books, newspapers, magazines, drawings or photographs which are stored in electronic, optical or magnetic recording mediums, i.e., an electronic book.

2. Description of the Prior Art

Characters, photographs and drawings are printed on paper to form books, newspapers and magazines. Printing on paper permits visual display of pieces of information, and the art of printing permits a lot of reproduction of the same contents within a relatively short time. Therefore, printing is an excellent mass communication means.

However, the use of paper carries associated high costs, such as in transportation, warehousing and disposal of used paper because of a massive and voluminous amount. In an attempt to save paper material, used paper is reclaimed, but reclaimed paper is of such a poor quality that printing is not permitted. At present forest resources are inevitably wasted to provide paper which can be used for printing.

In the hope of saving forest resources the use of electronic, optical or magnetic recording mediums as a substituted for paper has been taken into consideration. Some examples of such recording mediums are integrated circuit boards (electronic recording medium), compact disks (optical recording medium), floppy disks (magnetic recording medium), magnetic cards (magnetic recording medium), digital audiotape (magnetic recording medium), and laser cards (optical recording medium). These recording mediums require reading means as shown in the following table:

| recording medium | reading means | capacites (equivalent number of pages of the book) |
|---|---|---|
| IC card | exclusive reading means required as is the case with credit cards | 8K bytes (4 pages) |
| compact disk | CD-ROM drive | 12 cm CD CD-ROM 504 megabytes (270,000 pages) |
| floppy disk | floppy disk drive | 1 megabytes (500 pages) |
| magnetic card | cash dispenser and the like | 84 bytes (0.022 pages) |
| laser card | laser card reader | 2 megabytes (1000 pages) |

(Each page of a book is assumed to contain 2000 parameters which correspond to 2000 bytes.)

The manner of reading these recording mediums is totally different from the manner of reading books, newspapers or magazines.

A personal computer is used to read compact disks or floppy disks. It has a reading apparatus separate from the display of the computer. Its keyboard must be operated to have access to a desired content in such a recording medium for display. The whole apparatus is large in size, and the associated memory has an increased capacity large enough to permit a reference to or looking at information.

IC cards and magnetic cards are of the same size as credit cards. These recording mediums have a relatively small recording capacity, and are designed for a small scale application. IC cards can be renewed in content, and can be used for the same purpose as credit cards. As for magnetic cards these recording means are used as credit cards or prepaid telephone cards.

Laser cards require a reading apparatus of an increased size, compared with the reading apparatus for magnetic cards.

Electronic, magnetic or optical recording mediums have a variety of applications, but they cannot be used in the same fashion as paper on which characters are printed to convey pieces of information as in books, newspapers or magazines.

The above table shows that floppy disks and laser cards have a recording capacity comparable to books, newspapers or magazines. A compact disk, however, has unnecessarily large or superfluous recording capacity to store the content of ordinary printed matters excluding an encyclopedia. Laser cards are small in size, and have a capacity appropriate for recording information as much as ordinary printed matter. But, disadvantageously laser cards require a large-scale reading apparatus.

An electronic book is proposed which can be used in the same fashion as books, newspapers or magazines. This paperless book must meet the following requirements:

1) sentences, drawings or patterns can be displayed in the same fashion as books, newspapers or magazines;

2) small-sized magnetic or optical recording disks or IC cards which have as much content as a book having several hundred pages, can be read in the same fashion as books.

3) it must be portable in size and weight, and can be carried like a book. A person can read it everywhere.

In an attempt to make the device portable, parts to effect the following functions are eliminated from a personal computer-like object. Stated otherwise, a paperless book can be provided by depriving a personal computer of the following functions:

a) elimination of the need to print displayed contents (no printers required); and b) elimination of the need to effect complicated reference (no keyboard required for the purpose)

Extra requirements for such a paperless book are:

1) underlining function

Selected portions in the displayed information can be underlined as in books, newspapers or magazines.

2) contextual continuing function

If a sentence continues from page to page, the preceeding part can be shifted to the subsequent part of the sentence on the page now on display.

3) page-turning speed control

Subsequent pages are displayed one after another at intervals.

This interval can be controlled by pushing a selected key like turning over the pages of a book to meet the speed at which the reader reads the displayed pages.

4) Some readers feel bothered when required to push a selected key to turn over pages. Automatic page-turning function can be selected, and then pages will be displayed one after another at regular intervals.

5) Extra characters other than standard ones are required to be displayed, although rare in occurrence.

Storage of all extra characters, however would make the paperless book large beyond a portable size. This rare demand must be satisfied without using an inhibitively large capacity memory.

6) Requirements for composition must be met.

7) When occasions demand, stored pieces of information must be renewed to permit the display of the latest information.

SUMMARY OF THE INVENTION

According to a first aspect of the present invention an electronic book performs the function of putting a cursor on a selected position in a displayed page, locating the selected position, and underlining the part of the displayed page running from the selected start position to a desired end position. The position of the underlining is stored, and the underlining can be displayed when desired.

According to a second aspect of the present invention pages are turned over one after another automatically at regular intervals.

According to a third aspect of the present invention an exterior memory such as a floppy disk has a storage area allotted to store selected extra characters such as Sanscrit characters appearing in the content of the exterior memory. An inner memory or ROM stores standard characters in the form of digital font signals at selected addresses. When addressed, it supplies a particular font signal to permit excitation of selected liquid crystal piccels in the shape of a desired character. Thus, the inner memory functions as a character generator. Likewise, the extra characters which appear in the content of the exterior memory are stored in the form of digital font signals at selected addresses in the allotted area of the exterior memory. When the computer meets a character which is not contained in the inner memory, it identifies the character as an extra character, which is stored in the exterior memory itself. Then, the extra character is read out from the exterior memory to appear on the liquid crystal display. In short, a part of the exterior memory is used as an annex to the inner memory when presentation of extra characters is required, thus avoiding the use of an inhibitively large capacity inner memory which for the otherwise, would be necessitated to meet a rare demand for the presentation of selected extra characters.

According to a fourth aspect of the present invention pieces of information when transmitted on the air or on the telephone are received and stored in memory while classifying the contents in terms of code numbers. Stored pieces of information can be identified in terms of code numbers for renewal.

The word "memory" includes inner and exterior memories. Some examples of exterior memories are floppy disks, compact disks, IC cards, or other memories composed, for instance of LSI. ROMs and RAMs are used as inner memories.

With the functions as described above, an electronic book according to the present invention can be used in the same fashion as books. The reader can underline selected portions in displayed pages; pages can be automatically changed or turned over; characters of extra shape appear at the proper selected positions; and in some instances floppy, disks, magnetic cards or any other exterior memory is not required.

BRIEF DESCRIPTION OF THE DRAWINGS

The present invention will be better understood from the following description of preferred embodiments which are shown in the accompanying drawings.

DESCRIPTION OF THE PREFERRED EMBODIMENTS

Figure 1:
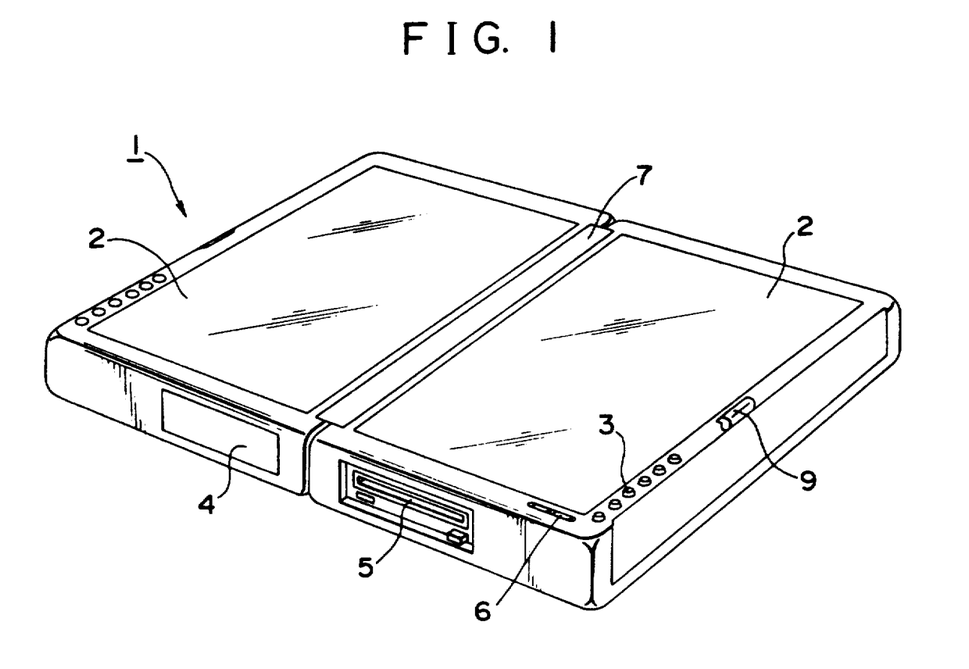
FIG. 1 is a perspective view of an electronic book according to the present invention in its opening position.

In FIG. 1 an electronic book is indicated at 1. It has a display 2. The display 2 may be a liquid crystal display, or a plasma display. The electronic book 1 has several keys 3, and in particular a key to indicate the display of subsequent pages, a key to indicate the return to the preceeding page, a key to indicate the display of the contents of the stored information, a key to put a cursor to a selected position on the displayed page, a key to locate the selected position, key to underline the part of the page between two selected positions, a key to indicate the automatic turning of subsequent page, a key to adjust intervals at which pages are automatically turned over, and a key to enlarge or reduce the size of characters on display.

Figure 2:
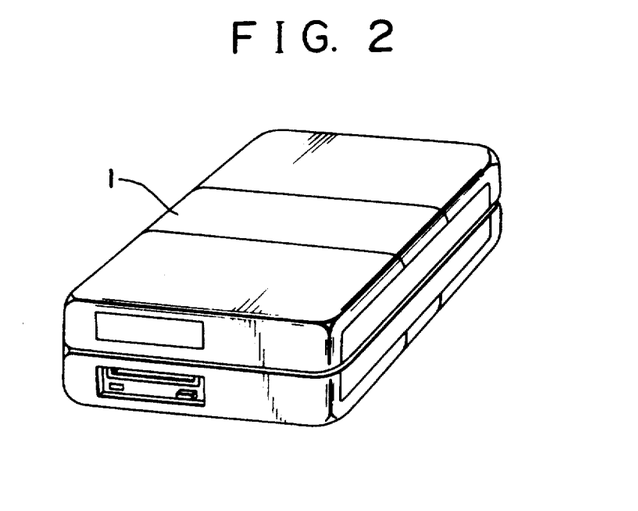
FIG. 2 is a perspective view of the electronic book in its closing position.
Figure 3:
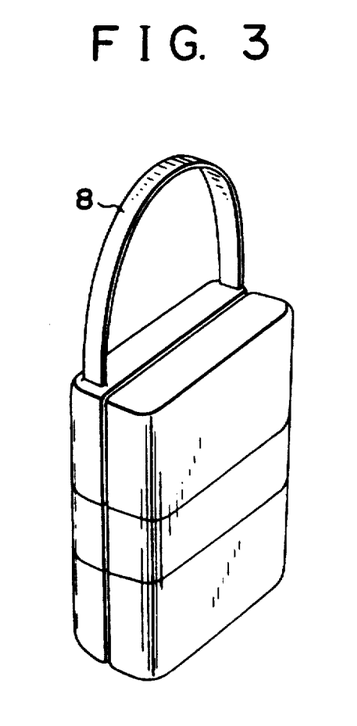
FIG. 3 is a perspective view of another electronic book having a strap.
Figure 4:
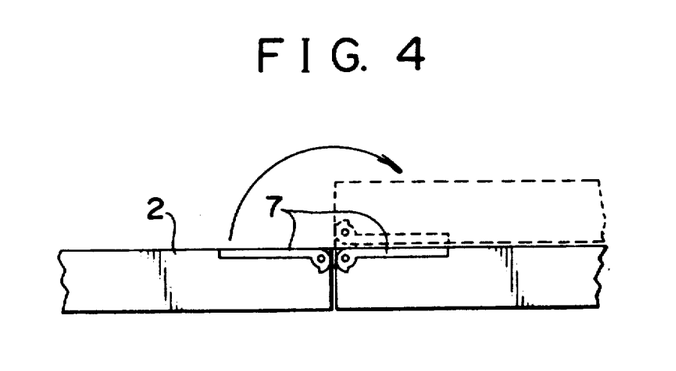
FIG. 4 is an end view of the electronic book, showing some details of the hinges used.

The electronic book has floppy disks stand in a square hole 4. A floppy disk is selected and is put in the floppy disk drive 5. After inserting the floppy disk in floppy disk drive 5, on/off switch 6 is turned on to start a display. The paperless book can be snapped shut in the position of FIG. 2 in which position latch 9 catches the counter edge recess. The paperless book can be opened flat with the aid of hinge 7. Strap 8 can be attached to the book body as shown in FIG. 3.

Figure 5:
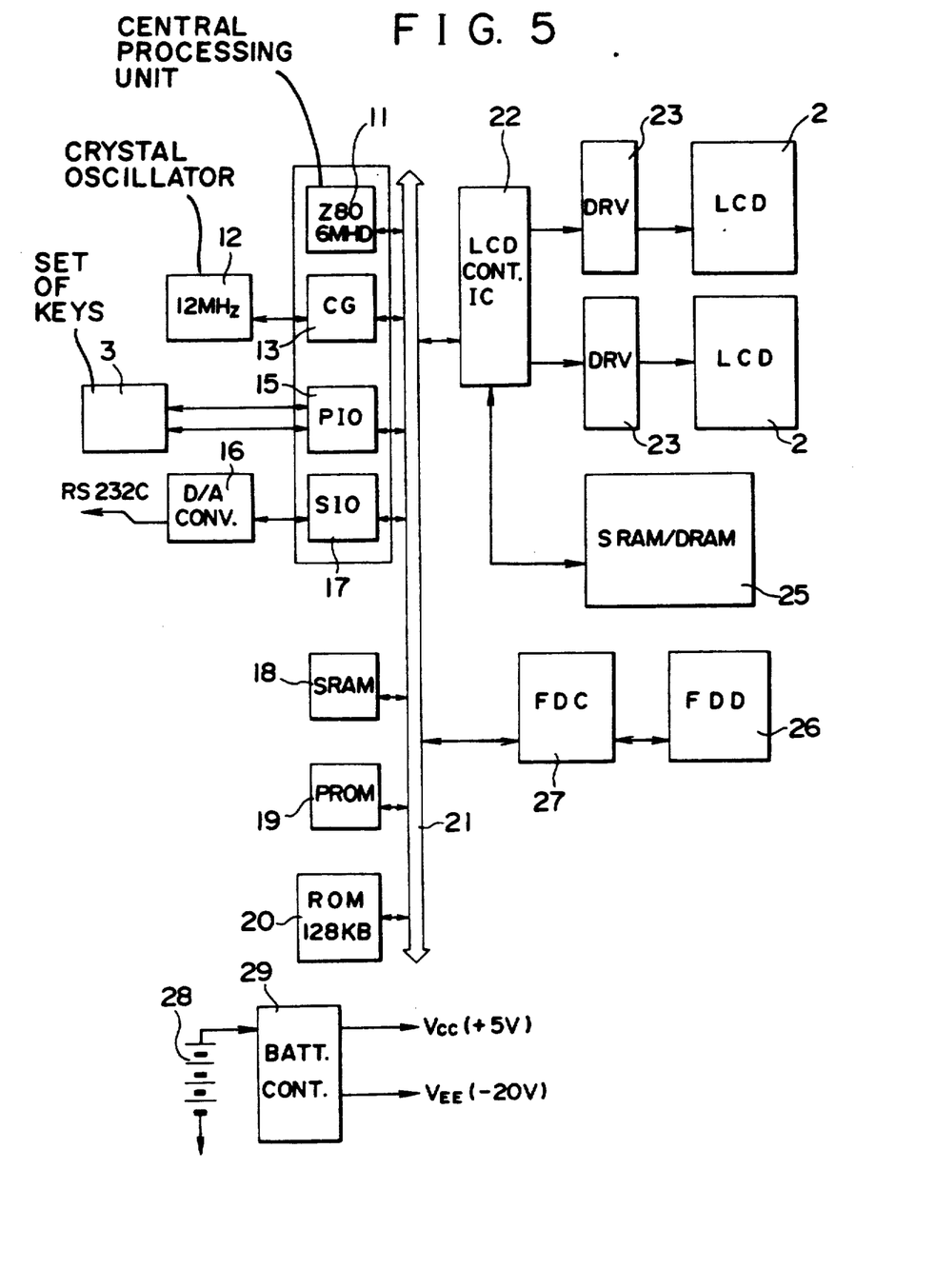
FIG. 5 is a block diagram showing the connection of components of the electronic book.

FIG. 5 shows the electronic book as comprising a set of keys 3 to perform different functions; input-and-output interface 15 connected to keys 3; central prosessing unit or microcomputer 11; crystal oscillator 12; clock pulse generator 13 connected to crystal oscillator 12 to determine the cyclic period according to which microcomputer 11 performs its functions or works repeatedly; input-and-output interface 17; converter 16 connected to input-and-output interface 17; liquid crystal drive control 22 having memory 25 associated therewith; two liquid crystal drives 23 connected to liquid crystal drive control 22; two liquid crystal displays 2 connected to liquid crystal drives 23; random access memory 18; memory 19 to store a program; read only memory 20 to store standard characters; floppy disk drive control 27; and floppy disk drive 26. These units are connected together by a bus 21. A battery 28 and a battery converter 29 function to supply necessary voltages, to selected units. A floppy disk may be put in the floppy disk drive 26. Floppy disk drive control 27 functions to bring the head of floppy disk drive 26 to a selected position of the floppy disk to read out pieces of information from the selected position of the floppy disk or write pieces of information in the selected position.

ROM 20 stores standard characters in the form of digital font signals at selected addresses. When addressed, it supplies a particular font signal to permit excitation of selected liquid crystal piccels in the shape of a desired character. Thus, the memory 20 functions as a character generator.

Random access memory 18 functions to store tentatively a part of the content of the floppy disk. The amount of information to be transfered from the floppy disk to memory 18 depends on the speed at which the reader can read the book because pieces of information must be supplied to displays 2 without making him wait for the appearance of subsequent pages.

Liquid crystal drives 23 are responsive to font signals for exciting selected dots or piccels in liquid crystal displays 2 in the form of corresponding characters.

Pieces of information, as much as two pages, are transfered from memory 18 to memory 25 associated with the liquid crystal driver control 22, which retrieve pieces of information from memory 25 without intermission to keep selected piccels excited in liquid crystal displays 2, thus permitting continuous visual presentation of information.

When a selected key is pushed, signals will be directed to computer 11 via input-and-output interface 15 and bus 21, thereby performing a selected function such as underlining, displaying of a subsequent page or returning to a preceeding page. In case of underlining floppy disk drive control 27 makes floppy disk drive 26 move its head from a selected start to an end position in the floppy disk, thus recording the underline in the floppy disk.

Communication with a distant data source by telephone can be effected by connecting computer 11 to telephone circuits via bus 21, input-and-output interface 17, converter 16 and a modem (not shown).

Here, it should be noted that an exterior memory, such as a floppy disk has a storage area allotted to storage of the selected extra characters such as Sanscrit characters appearing in the content of the exterior memory.

As described earlier, an inner memory or ROM stores only standard characters in the form of digital font signals at selected addresses. When addressed, it supplies a particular font signal to permit excitation of selected liquid crystal piccels in the shape of a desired character. Thus, the inner memory functions as a character generator. Likewise, the extra characters which appear in the content of the exterior memory are stored in the form of digital font signals at selected addresses in the allotted area of the exterior memory. When the computer meets a character which is not contained in the inner memory, it identifies the character as an extra character, which is stored in the exterior memory itself. Then, the extra character is read out from the exterior memory to appear on the liquid crystal display. Thus, a part of the exterior memory is used as an annex to the inner memory when presentation of extra characters is required.

Pieces of information to be presented the in electronic book can be renewed by: (1) putting new pieces of information directly in the inner memory or RAM 18 or (2) changing exterior memories.

Figure 6:
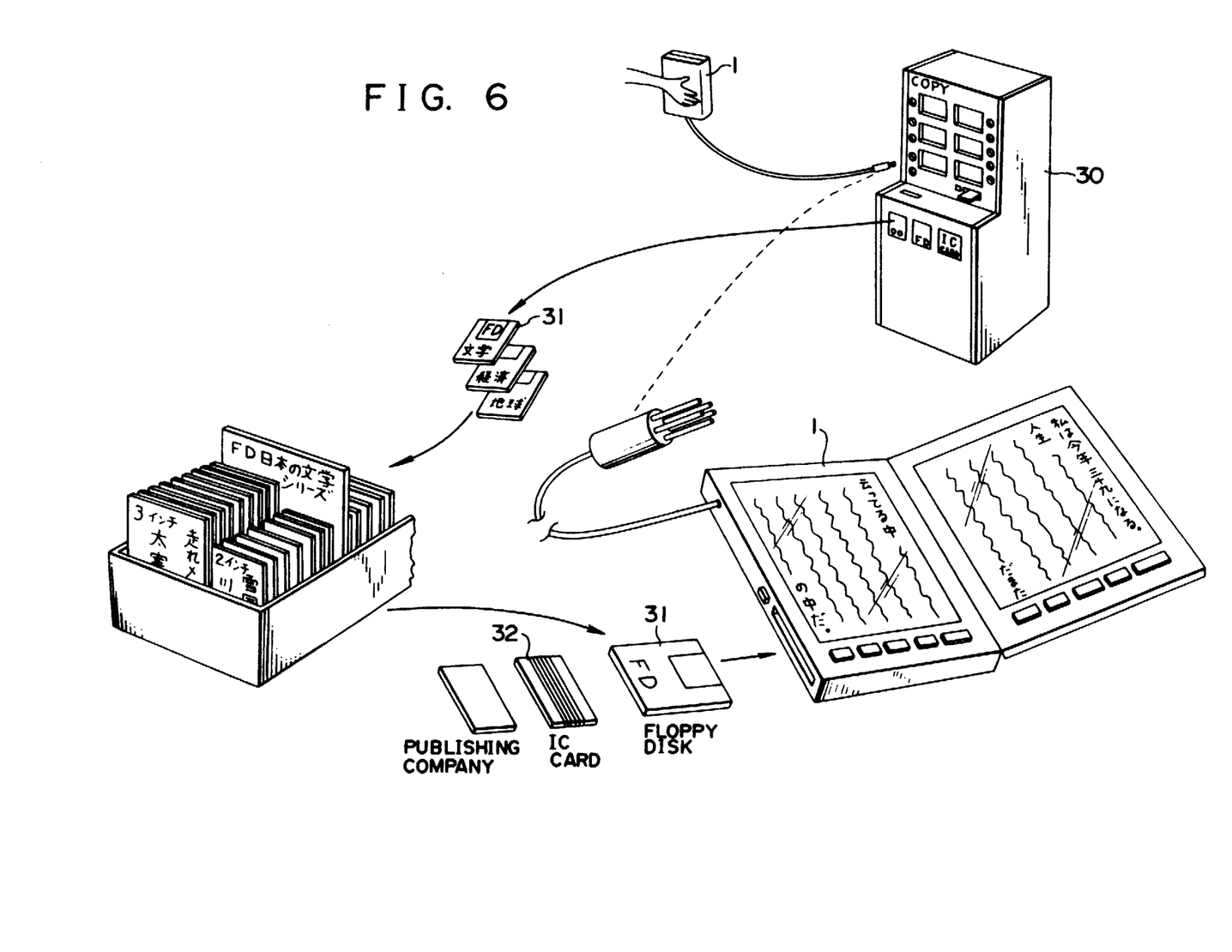
FIG. 6 shows how stored pieces of information can be renewed.

As shown in FIG. 6, data can be transferred at an increased speed to an automatic, information vending machine 30 installed, for instance in a railway station by using exclusive telephone circuits. Data can be transferred at an increased speed into an electronic book simply by inserting a plug of the electronic book in the receptacle of the information vending machine 30. Electronic books of the type in which data can be transferred by telephone, require no mechanical parts to handle, for instance floppy disks, and accordingly the weight and cost of such electronic books can be reduced.

Also, such an automatic vending machine 30 may sell new floppy disks 31 or IC cards every week, and people can buy daily or weekly floppy disks or IC cards. Used floppy disks or IC cards can be recycled. (No memory mediums can be wasted, and therefore, there is no problem of disposing after-use mediums in contrast to printed matters such as old magazines.)

Figure 7:
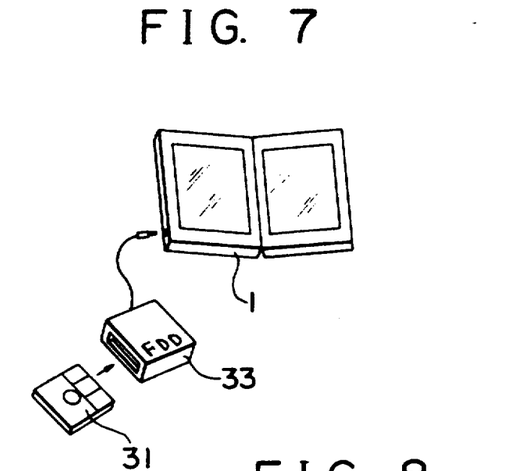
FIG. 7 shows a mode of renewing pieces of information using a floppy disk and a data transfer unit in combination with an electronic book according to the present invention.
Figure 8:
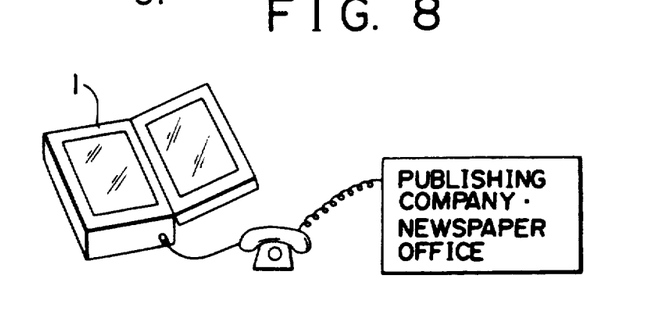
FIG. 8 shows a mode of renewing pieces of information using a telephone network in combination with an electronic book according to the present invention.

As shown in FIG. 7, data transfer unit 33 may be provided as being separate from electronic book 1. In use, floppy disk 31 is put in data transfer unit 33, which is connected to electronic book 1. The contents of floppy disk 31 will be transferred to the inner memory of electronic book 1. This type of electronic book 1 is composed of display and associated components only, and accordingly it is light, and can be carried like a book and can be read everywhere.

A variety of information such as news, statistical data, novels, games etc. will be commercially available. After reading such information, they can be transferrd from electronic books to personal computers. Only a desired piece of information (for instance, yesterday's baseball score of the "Giants") can be selectively transferrd from an information vending machine to an electronic book.

Other modes of information renewal are: transfer and renewal of information via telephone and broadcast.

Transfer of information via a telephone network

Electronic books which are designed to obtain information via a telephone network, have no floppy disk drive. Pieces of information may be transferred directly and stored in the inner memory of the electronic book via telephones and appropriate modems. Later, a reader can have access to a desired piece of information for display.

Transfer of information on the air

Figure 9:
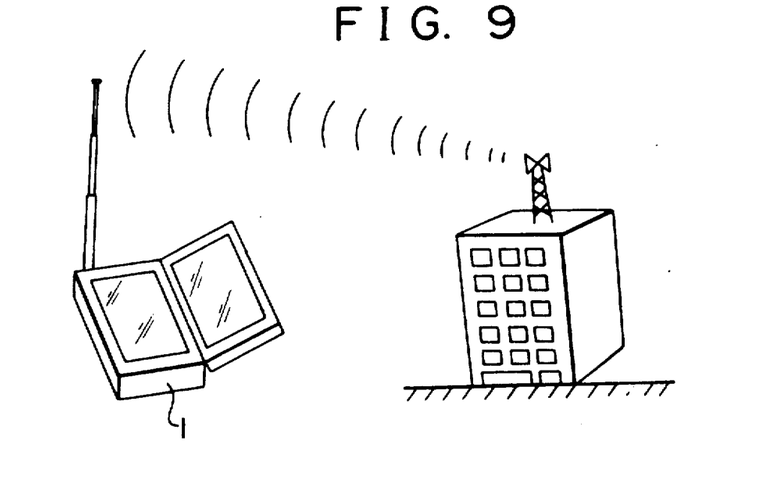
FIG. 9 shows a mode of renewing pieces of information using broadcase wave in combination with an electronic book according to the present invention.

Electronic books may be designed to receive pieces of information which are carried by electromagnetic waves radiating from a broadcasting station, as shown in FIG. 9. Specifically, such electronic books perform the function of demodulating and storing pieces of information (characters, drawings or photographs) from the received electomagnetic wave. A reader can have access to each page of information thus stored for display. Pieces of information on the air may be classified according to the subject, and then the so classified pieces of information may be put in allotted positions for renewal in the inner memory of the electronic book. The electronic book may be left several hours in condition for selectively receiving broadcasted information. Later, the so stored information can be displayed on the screen of the electronic book. This can be called "character broadcast receiving apparatus".

Electronic book 1 performs a variety of functions according to the program contents stored in memory 19.

Underlining function

A selected key is used to move a cursor between two selected start and end positions, thereby locating these start and end positions. Another selected key is used to underline the part of the page thus selected. The underlining is stored in the exterior memory of the book for later display. Specifically, floppy disk drive control 27 functions to make floppy disk drive 26 move its recording head to a selected marginal position of the floppy disk, and then underlining signals may be stored there in terms of pages, lines and characters between which characters the underline extends.

The marginal part of a floppy disk allotted to storage of underlining may have a capacity large enough to store 1,000 underlines, each requiring 4 bytes for a start position and 4 bytes for an end position. Thus, 8,000 bytes are required for recording 1,000 underlines. This amount, however, is only 1/125 of a 1 megabyte floppy disk storage capacity, and therefore, the storage of undelines will not substantially reduce the recording space available for storage of information. Every type of electronic book can have this underlining function.

Contextual continuity function

In the case where a sentence runs from page to page, the part of the sentence remaining in the preceding page (or subsequent page) can be shifted to the subsequent page (or preceding page) now on display, thereby permitting presentation of the sentence in its complete form. Assume that the "n"th page is now on display and that the "n+1"th page is about to be displayed. The part of the sentence remaining in the "n"th page will be put ahead of the "n+1"th page when it is displayed. Conversely, when returning to the "n−1"th page, the remaining part of the sentence in the "n"th page will be put to the end of the "n−1"th page.

Thanks to this function the reader can easily understand the context of a sentence continuing from page to page. Every type of electronic book may be equipped with this contextual continuity function.

Tentative storage amount controlling function

A randam access memory having a large storage capacity is almost inhibitively expensive, and therefore an inner memory economically permitted has a limited storage capacity.

Also, it is required that sequential presentation of information on the screen of the paperless book meet the speed at which in an individual reader read the book. The electronic book has a capability of determining the intervals at which the reader pushes the page-turning key, thereby determining the amount of information which must be transfered from an exterior memory such as a floppy disk to the inner memory of the electronic book at a time. Thus, the supply and presentation of information balances, and the reader can read sequential pages with the natural feeling that he would have when reading a book. This function is applied only to an electronic book using external memory as an information source.

Automatic page-turning function

Pages can be presented on display one after another automatically without using the page-turning key. Once the automatic page-turning key has been pushed, pages will be turned over at regular intervals, which are determined by an associated time. The timer can be set to shorten intervals for quick readers.

Every type of electronic book may be equipped with this function.

Presentation of extra characters

The extra characters which appear in an exterior memory such as a floppy disk, are stored in the marginal are of the floppy disk, thus permitting it to function as an annex to the inner memory having standard characters stored therein. Thanks to the use of marginal recording area of the floppy disk for storing extra characters an economically inhibitively large capacity memory is not required in the electronic book.

A character which is presented with 16×16 dots, requires 32 bytes, and a character which is presented with 24×24 dots, requires 72 bytes. Assume that 200 extra characters appear in the content of a floppy disk. In the former case 32×200 (6,400) bytes are required whereas in tha latter case 72×200 (14,400) bytes are required. The amount of 6,400 bytes is only 0.64% of 1 megabyte floppy disk's capacity whereas the amount of 14,400 bytes is only 1.44% of a 1 megabyte floppy disk's capacity. Therefore, no substantial reduction of information recording capacity is caused.

Also, it is possible to make the marginal area of the floppy disk responsive to the increasing number of the extra characters appearing in the memory medium for enlarging the marginal area until all extra characters have been stored. This function is described as being applied to exterior memory such as a floppy disk, but it can be equally applied to the inner memory of the electronic book.

Composition or making-up function

An exterior memory has composition control codes among characters, thereby permitting characters on display to be arranged in the same composition as books, newspapers or magazines. Specifically, composition control codes represent: capital/small letter selection; indentation; heating; affixment; character modification; longitudinal/lateral arrangement; new paragraph; line/space change; extra character used; underlining; and inhibitions. A decoding table is stored in the inner memory 19. Every time a composition control code is encountered, it will be referred to the decoding table, and the required composition control will be carried out according to the program which is stored in memory 19.

The standard decoding table may be stored in inner memory 19, whereas the specific decoding table which must be used prior to reference to the standard table, may be stored in the exterior memory, such as floppy disks.

Information selecting-and-storing function

In the case where renewal of information is effected by broadcast, information on the air can be selectively stored in memory in an electronic book. This selective renewal of information can be effected in retrieving information from a telephone, too. Selection may be effected in terms of codes, which are allotted to different kinds or subjects of information and to different areas of memory in an electronic book. Among a lot of information on the air or over the telephone desired pieces of information are to be put, may be found in terms of the same code. Thus, the old pieces of information in the storage area will be replaced by the latest pieces of information of the same subject.

The social circumstances which favor electronic books are:

(1) Recently, publishing has been effected by composing sentences with word processors and by forming or typesetting the so composed sentences with computerized typesetting systems. Necessary digital information si stored in magnetic recording tape. Therefore, required digital information can be readily transferred to magnetic means such as floppy disks.

2) There has been a social demand for saving forest resources on a global scale.

3) There is an ever increasing demand for saving spaces to store books, magazines or other printed matter.

Paperless books according to the present invention can meet these demands to some extent.

What is claimed is:

1. Apparatus for retrieving and displaying information contained in an electronic book, comprising:
    memory means for storing the information as sentences composed of standard characters and extra characters, and as separate pages of the book, said memory means including electronic inner memory means for storing the standard characters and electronic exterior memory means for storing the extra characters;
    means for displaying the information stored in said memory means as a page of the book;
    first key means for displaying subsequent pages of the book stored in said memory means;
    second key means for returning the display to a preceding page of the book stored in said memory;
    third key means for indicating the display of each sentence displayed by said means for displaying, such that access is permitted to a desired page of the book store din said memory means and such that the pages of the book can be displayed in sequence;
    timer means for automatically displaying subsequent pages of the book at a predetermined length of time;
    fourth key means for positioning a cursor at a selected position on the displayed page;
    fifth key means to locate said selected position; and
    sixth key means for underlining a part of the displayed page from said selected position to a desired ending position, with the underlining drawn being stored in said memory means.

2. The apparatus as defined in claim 1, wherein said memory means includes means for receiving information transmitted by air, said received information transmitted by air being identified by code numbers, thereby permitting addressing said memory means with said code numbers.

3. The apparatus as defined in claim 1, wherein said memory means includes means for receiving information transmitted by telephone, said received information transmitted by telephone being identified by code numbers, thereby permitting addressing said memory means with, said code numbers.

* * * * *